United States Patent
Misra et al.

(10) Patent No.: US 7,295,596 B2
(45) Date of Patent: *Nov. 13, 2007

(54) REDUCED COMPUTATION IN JOINT DETECTION

(75) Inventors: Raj Mani Misra, Fremont, CA (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/010,703

(22) Filed: Dec. 13, 2004

(65) Prior Publication Data
US 2005/0094712 A1    May 5, 2005

Related U.S. Application Data

(63) Continuation of application No. 09/662,404, filed on Sep. 14, 2000, now Pat. No. 6,831,944.

(60) Provisional application No. 60/153,801, filed on Sep. 14, 1999.

(51) Int. Cl.
  H04B 1/69     (2006.01)
  H04B 1/713    (2006.01)
(52) U.S. Cl. .......... 375/147; 375/267; 375/347
(58) Field of Classification Search ........ 375/147, 375/148, 149, 136, 316, 326, 144, 150, 267, 375/346, 347, 349; 376/147, 148, 150, 144, 376/267, 346, 347–349; 455/423, 443, 444, 455/67.4; 370/342, 280, 328, 294
See application file for complete search history.

(56) References Cited

U.S. PATENT DOCUMENTS

| | | | |
|---|---|---|---|
| 4,658,225 A | 4/1987 | Dukes et al. | |
| 5,727,032 A | 3/1998 | Jamal et al. | |
| 5,880,644 A | 3/1999 | Schmidt et al. | |
| 6,175,587 B1* | 1/2001 | Madhow et al. | 375/148 |
| 6,304,618 B1 | 10/2001 | Hafeez et al. | |
| 6,314,147 B1 | 11/2001 | Liang et al. | |
| 6,339,612 B1 | 1/2002 | Stewart et al. | |

(Continued)

FOREIGN PATENT DOCUMENTS

WO    99/40698    8/1999

(Continued)

OTHER PUBLICATIONS

Karimi, H. R., et al "Personal Indoor and Mobile Radio Communications", The Ninth IEEE International Symposium on Communications, Sep. 1998, vol. 3, pp. 1340-1345.*

(Continued)

*Primary Examiner*—Mohammed Ghayour
*Assistant Examiner*—Qutub Ghulamali
(74) *Attorney, Agent, or Firm*—Volpe and Koenig, P.C.

(57) ABSTRACT

A user equipment receives a plurality of transmitted data signals in a communication system. The transmitted data signals are received. A channel response is determined for each received data signal. A system response is determined based on in part the channel signals. The system response is expanded to be piecewise orthogonal. Data from the received data signals is retrieved based on in part the expanded system response.

6 Claims, 3 Drawing Sheets

U.S. PATENT DOCUMENTS

Figure 1:
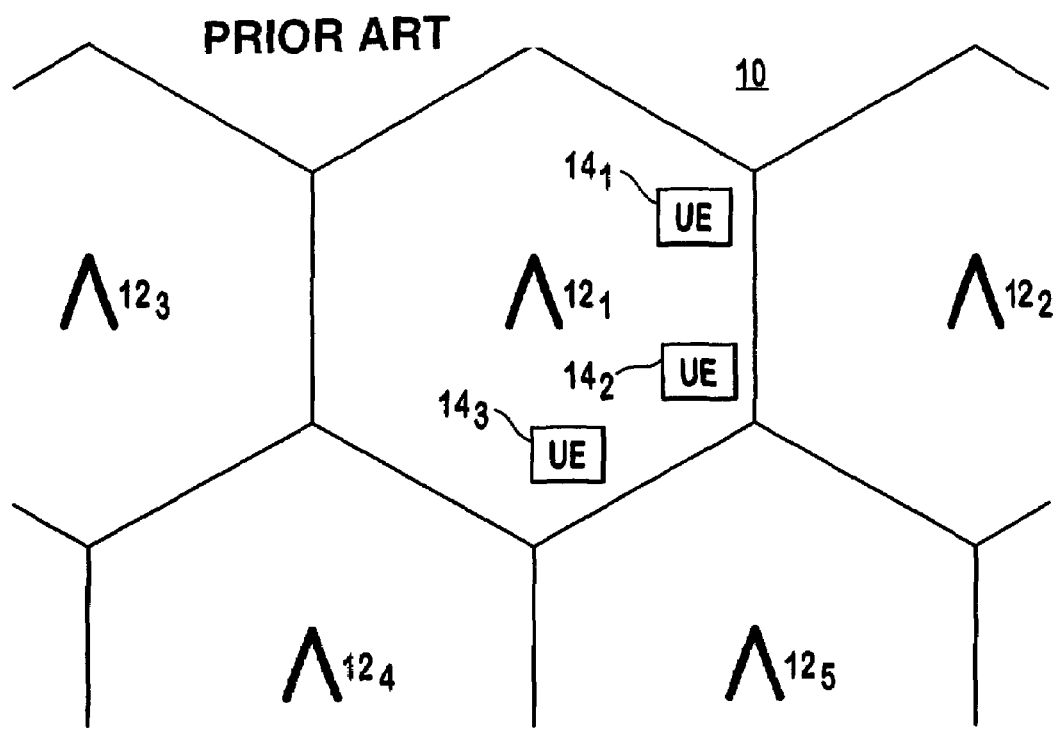

| | | | | |
|---|---|---|---|---|
| 6,442,154 | B1 * | 8/2002 | Bottomley | 370/342 |
| 6,442,193 | B1 * | 8/2002 | Hirsch | 375/147 |
| 6,477,210 | B2 * | 11/2002 | Chuang et al. | 375/340 |
| 6,512,534 | B2 | 1/2003 | Koga | |
| 6,594,487 | B1 * | 7/2003 | Nasshan et al. | 455/423 |
| 6,600,776 | B1 * | 7/2003 | Alamouti et al. | 375/147 |
| 6,603,801 | B1 * | 8/2003 | Andren et al. | 375/147 |
| 6,647,077 | B1 * | 11/2003 | Shan et al. | 375/346 |
| 6,697,633 | B1 | 2/2004 | Dogan et al. | |
| 6,775,260 | B1 * | 8/2004 | Dabak et al. | 370/342 |

FOREIGN PATENT DOCUMENTS

| | | |
|---|---|---|
| WO | 99/59351 | 11/1999 |

OTHER PUBLICATIONS

Yfoulis, C.A.; Muir, A.; Pettit, N.B.O.L.; Wellstead, P.E., "Stabilization of orthogonal piecewise linear systems using piecewise linear Lyapunov-like functions" IEEE, vol. 2, Dec. 1998 pp. 1476-1481.*

Wu Bin, "Identification of nonlinear systems via piecewise general orthogonal polynomials operator" Decision and Control, 2001. Proceedings of the 40th IEEE Conference on, vol. 3, Dec. 2001 pp. 2538-2543.*

Karimi, H.R. and Anderson, N.W., "A Novel and Efficient Solution to Blocked-Based Joint-Detection Using Approximate Cholesky Factorization", Personal, Indoor and Mobile Radio Communications, The Ninth IEEE International Symposium on communications, Sep. 1998, vol. 3 pp. 1340-1345.*

Anja Klein and Paul W. Baier, "Linear Unbiased Data Estimation in Mobile Radio Systems Applying CDMA", IEEE Journal on Selected Areas in Communications, vol. 11, No. 7, Sep. 1993, pp. 1058-1065.

Lars K. Rasmussen, Teng J. Lim and Ana-Louise Johansson, "A Matrix-Algebraic Approach to Successive Interference Cancellation in CDMA", IEEE Transactions on Communications, vol. 48, No. 1, Jan. 2000, pp. 145-151.

Anja Klein, Ghassan Kawas Kaleh and Paul W. Baier, "Zero Forcing and Minimum Mean-Square-Error Equalization for Multiuser Detection in Code-Division Multiple-Access Channels", IEEE Transactions on Vehicular Technology, vol. 45, No. 2, May 1996, pp. 276-287.

H.R. Karimi and N.W. Anderson, "A Novel and Efficient Solution to Block-Based Joint-Detection Using Approximate Cholesky Factorization", Ninth IEEE International Symposium, vol. 3, Sep. 8-11, 1998, pp. 1340-1345.

Pulin Patel and Jack Holtzman, "Analysis of a Simple Successive Interference Cancellation Scheme in a DS/CDMA System", IEEE Journal on Selected Areas in Communications, vol. 12, No. 5, Jun. 1994, pp. 796-807.

Andrew L. C. Hui and Khaled Ben Letaief, "Successive Interference Cancellation for Multiuser Asynchronous DS/CDMA Detectors in Multipath Fading Links", IEEE Transactions on Communications, vol. 46, No. 3, Mar. 1998, pp. 384-391.

Youngkwon Cho and Jae Hong Lee, "Analysis of an Adaptive SIC for Near-Far Resistant DS-CDMA", IEEE Transactions on Communications, vol. 46, No. 11, Nov. 1998, pp. 1429-1432.

J. Malard et al., "Efficiency and Scalability of Two Parallel QR Factorization Algorithms", Proceedings of the Scalable High-Performance Computing Conference (Cat. No. 94TH0637-9), Proceedings of IEEE Scalable High Performance Computing Conference, Knoxville, TN, USA, May 23-25, 1994, pp. 615-622.

Tik-Bin Oon, Raymond Steele and Ying Li, "Performance of an Adaptive Successive Serial-Parallel CDMA Cancellation Scheme in Flat Rayleigh Fading Channels", IEEE Transactions on Vehicular Technology, vol. 49, No. 1, Jan. 2000, pp. 130-147.

"Channel Impulse Response Model", UMTS 30.03 version 3.2.0, TR 101 112 version 3.2.0 (1998), pp. 42-43 and 65-66.

3rd Generation Partnership Project; Technical Specification Group Radio Access Networks; UTRA (UE) TDD; Radio Transmission and Reception 3G TS 25.102 version 3.3.0 Release 1999, p. 37.

3rd Generation Partnership Project; Technical Specification Group Radio Access Network; Physical Channels and Mapping of Transport Channels onto Physical Channels (TDD), 3G TS 25.221 version 3.2.0 (Mar. 2000), pp. 3-10.

Li et al., "QR Decomposition Based Blind Channel Identification and Equalization", IEEE, Conference Record of the Thirty-second Asilomar Conference on Signals, Systems & Computers, vol. 2, Nov. 1998, pp. 1484-1488.

Turner et al., Implementation of a Conjugate Matched Filter Adaptive Receiver for DS-CDMA, IEEE, Conference Proceedings Singapore ICCS '94, vol. 2, Nov. 1994, pp. 369-373.

* cited by examiner

REDUCED COMPUTATION IN JOINT DETECTION

CROSS REFERENCE TO RELATED APPLICATION

This application is a continuation of U.S. patent application Ser. No. 09/662,404 filed Sep. 14, 2000, now U.S. Pat. No. 6,831,944 which in turn claims priority to U.S. Provisional Patent Application No. 60/153,801, filed on Sep. 14, 1999.

BACKGROUND

The invention generally relates to wireless communication systems. In particular, the invention relates to joint detection of multiple user signals in a wireless communication system.

FIG. 1 is an illustration of a wireless communication system 10. The communication system 10 has base stations $12_1$ to $12_5$ which communicate with user equipments (UEs) $14_1$ to $14_3$. Each base station $12_1$ has an associated operational area where it communicates with UEs $14_1$ to $14_3$ in its operational area.

In some communication systems, such as code division multiple access (CDMA) and time division duplex using code division multiple access (TDD/CDMA), multiple communications are sent over the same frequency spectrum. These communications are typically differentiated by their chip code sequences. To more efficiently use the frequency spectrum, TDD/CDMA communication systems use repeating frames divided into time slots for communication. A communication sent in such a system will have one or multiple associated chip codes and time slots assigned to it based on the communication's bandwidth.

Since multiple communications may be sent in the same frequency spectrum and at the same time, a receiver in such a system must distinguish between the multiple communications. One approach to detecting such signals is single user detection. In single user detection, a receiver detects only the communication from a desired transmitter using a code associated with the desired transmitter, and treats signals of other transmitters as interference.

In some situations, it is desirable to be able to detect multiple communications simultaneously in order to improve performance. Detecting multiple communications simultaneously is referred to as joint detection. Some joint detectors use Cholesky decomposition to perform a minimum mean square error (MMSE) detection and zero-forcing block equalizers (ZF-BLEs). These detectors have a high complexity requiring extensive receiver resources.

Accordingly, it is desirable to have alternate approaches to joint detection.

SUMMARY

A user equipment receives a plurality of transmitted data signals in a communication system. The transmitted data signals are received. A channel response is determined for each received data signal. A system response is determined based on in part the channel signals. The system response is expanded to be piecewise orthogonal. Data from the received data signals is retrieved based on in part the expanded system response.

BRIEF DESCRIPTION OF THE DRAWING(S)

Figure 3:
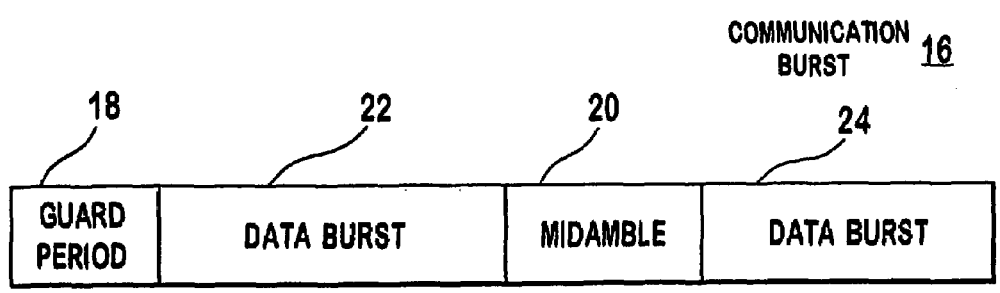
Figure 2:
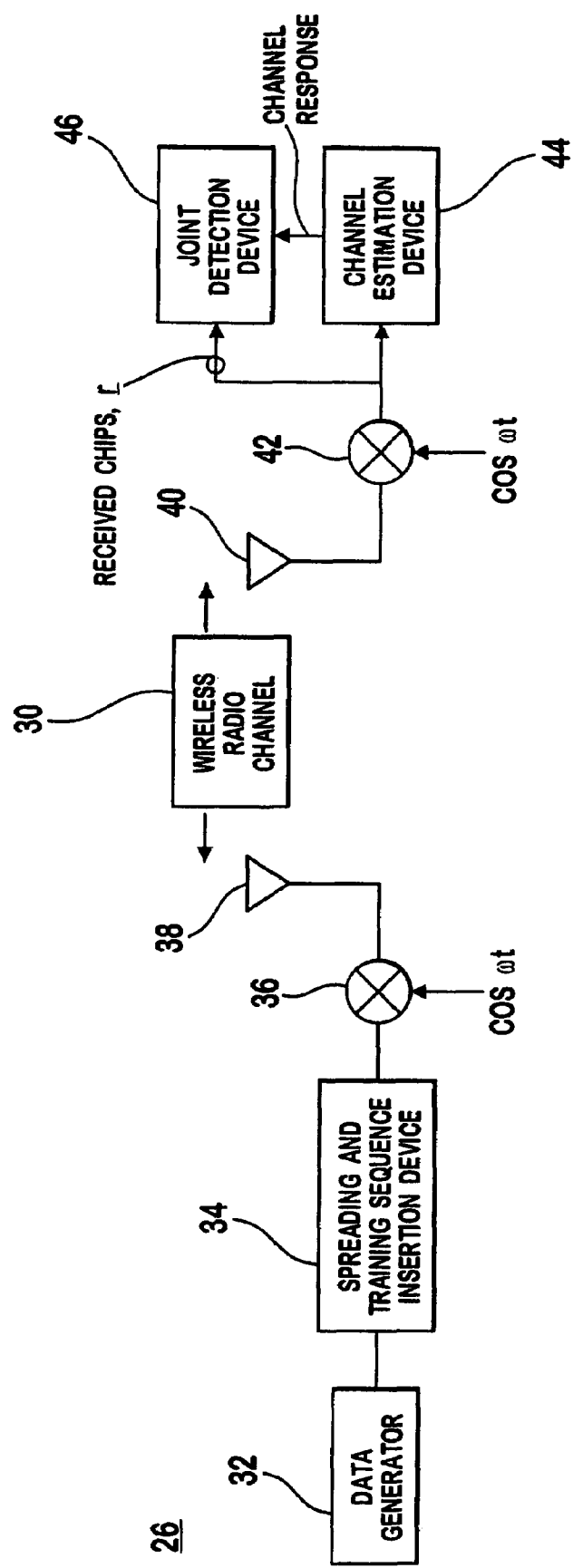
Figure 4:
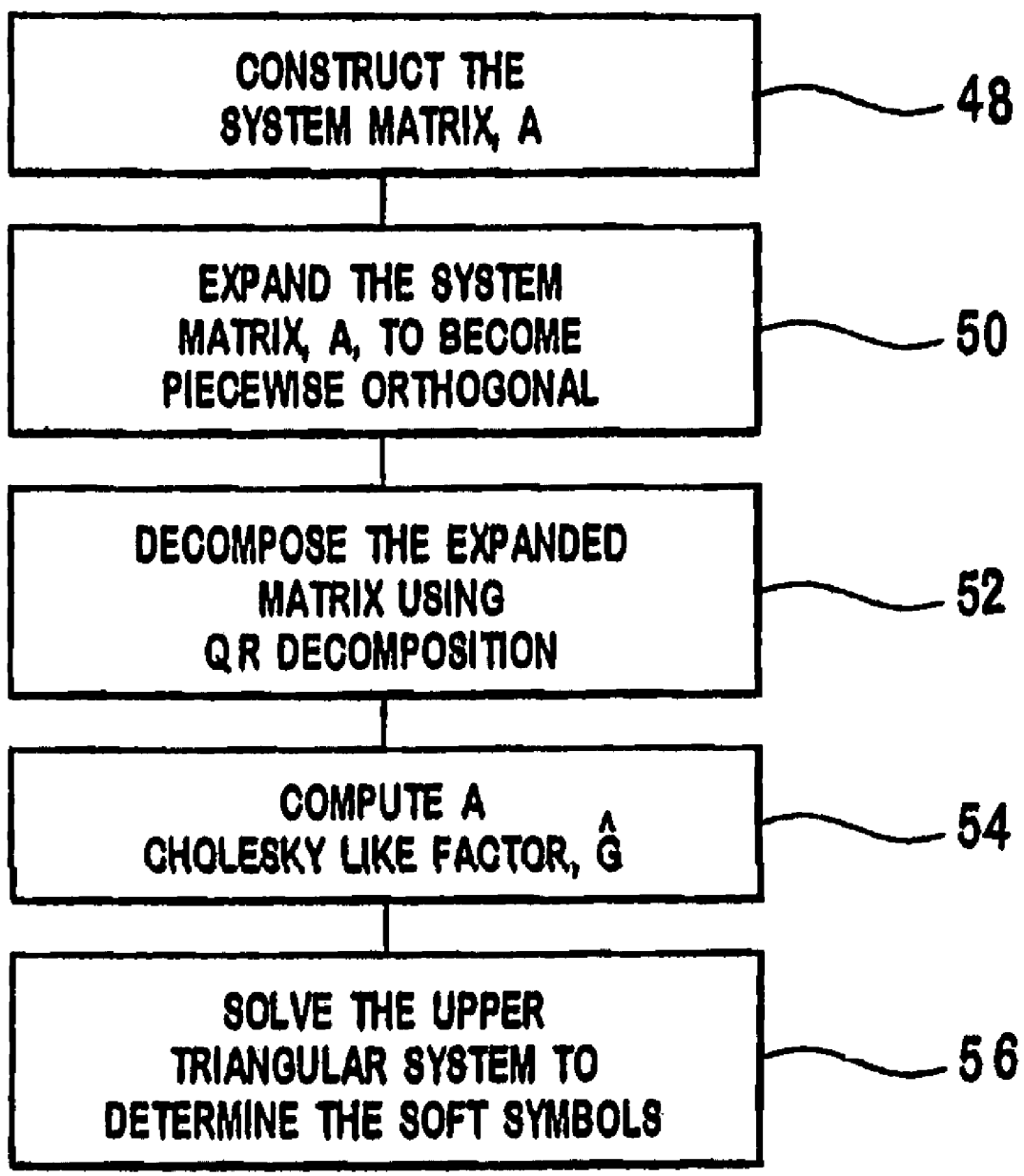

FIG. 1 is a wireless communication system.
FIG. 2 is a simplified transmitter and a receiver using joint detection.
FIG. 3 is an illustration of a communication burst.
FIG. 4 is an illustration of reduced computation joint detection.

DETAILED DESCRIPTION OF THE PREFERRED EMBODIMENT(S)

FIG. 2 illustrates a simplified transmitter 26 and receiver 28 using joint detection in a TDD/CDMA communication system. In a typical system, a transmitter 26 is in each UE $14_1$ to $14_3$ and multiple transmitting circuits 26 sending multiple communications are in each base station $12_1$ to $12_5$. A base station $12_1$ will typically require at least one transmitting circuit 26 for each actively communicating UE $14_1$ to $14_3$. The joint detection receiver 28 may be at a base station $12_1$, UEs $14_1$ to $14_3$ or both. The joint detection receiver 28 receives communications from multiple transmitters 26 or transmitting circuits 26.

Each transmitter 26 sends data over a wireless communication channel 30. A data generator 32 in the transmitter 26 generates data to be communicated over a reference channel to a receiver 28. Reference data is assigned to one or multiple codes and/or time slots based on the communications bandwidth requirements. A spreading and training sequence insertion device 34 spreads the reference channel data and makes the spread reference data time-multiplexed with a training sequence in the appropriate assigned time slots and codes. The resulting sequence is referred to as a communication burst. The communication burst is modulated by a modulator 36 to radio frequency. An antenna 38 radiates the RF signal through the wireless radio channel 30 to an antenna 40 of the receiver 28. The type of modulation used for the transmitted communication can be any of those known to those skilled in the art, such as direct phase shift keying (DPSK) or quadrature phase shift keying (QPSK).

A typical communication burst 16 has a midamble 20, a guard period 18 and two data bursts 22, 24, as shown in FIG. 3. The midamble 20 separates the two data bursts 22, 24 and the guard period 18 separates the communication bursts to allow for the difference in arrival times of bursts transmitted from different transmitters. The two data bursts 22, 24 contain the communication burst's data and are typically the same symbol length.

The antenna 40 of the receiver 28 receives various radio frequency signals. The received signals are demodulated by a demodulator 42 to produce a baseband signal. The baseband signal is processed, such as by a channel estimation device 44 and a joint detection device 46, in the time slots and with the appropriate codes assigned to the communication bursts of the corresponding transmitters 26. The channel estimation device 44 uses the training sequence component in the baseband signal to provide channel information, such as channel impulse responses. The channel information is used by the joint detection device 46 to estimate the transmitted data of the received communication bursts as soft symbols.

The joint detection device 46 uses the channel information provided by the channel estimation device 44 and the known spreading codes used by the transmitters 26 to estimate the data of the various received communication bursts. Although joint detection is described in conjunction with a TDD/CDMA communication system, the same approach is applicable to other communication systems, such as CDMA.

One approach to joint detection in a particular time slot in a TDD/CDMA communication system is illustrated in FIG. 4. A number of communication bursts are superimposed on each other in the particular time slot, such as K communication bursts. The K bursts may be from K different transmitters. If certain transmitters are using multiple codes in the particular time slot, the K bursts may be from less than K transmitters.

Each data burst 22, 24 of the communication burst 16 has a predefined number of transmitted symbols, such as $N_S$. Each symbol is transmitted using a predetermined number of chips of the spreading code, which is the spreading factor (SF). In a typical TDD communication system, each base station $12_1$ to $12_5$ has an associated scrambling code mixed with its communicated data. The scrambling code distinguishes the base stations from one another. Typically, the scrambling code does not affect the spreading factor. Although the terms spreading code and factor are used hereafter, for systems using scrambling codes, the spreading code for the following is the combined scrambling and spreading codes. Each data burst 22, 24 has $N_S \times SF$ chips.

The joint detection device 46 estimates the value that each data burst symbol was originally transmitted. Equation 1 is used to determine the unknown transmitted symbols.

$$r = Ad + n \quad \text{Equation 1}$$

In Equation 1, the known received combined chips, r, is a product of the system response, A, and the unknown transmitted symbols, d. The term, n, represents the noise in the wireless radio channel.

For K data bursts, the number of data burst symbols to be recovered is $Ns \times K$. For analysis purposes, the unknown data burst symbols are arranged into a column matrix, d. The d matrix has column blocks, $d_1$ to $d_{Ns}$, of unknown data symbols. Each data symbol block, $d_i$, has the $i^{th}$ unknown transmitted data symbol in each of the K data bursts. As a result, each column block, $d_i$, has K unknown transmitted symbols stacked on top of each other. The blocks are also stacked in a column on top of each other, such that $d_1$ is on top of $d_2$ and so on.

The joint detection device 46 receives a value for each chip as received. Each received chip is a composite of all K communication bursts. For analysis purposes, the composite chips are arranged into a column matrix, r. The matrix r has a value of each composite chip, totaling Ns*SF chips.

A is the system response matrix. The system response matrix, A, is formed by convolving the impulse responses with each communication burst chip code. The convolved result is rearranged to form the system response matrix, A (step 48).

The joint detection device 46 receives the channel impulse response, $h_i$, for each $i^{th}$ one of the K communication bursts from the channel estimation device 44. Each $h_i$ has a chip length of W. The joint detection device convolves the channel impulse responses with the known spreading codes of the K communication bursts to determine the symbol responses, $s_1$ to $s_K$, of the K communication bursts.

A common support sub-block, S, which is common to all of the symbol responses is of length $K \times (SF+W-1)$.

The A matrix is arranged to have Ns blocks, $B_1$ to $B_{Ns}$. Each block has all of the symbol responses, $s_1$ to $s_K$, arranged to be multiplied with the corresponding unknown data block in the d matrix, $d_1$ to $d_{Ns}$. For example, $d_1$ is multiplied with $B_1$. The symbol responses, $s_1$ to $s_K$, form a column in each block matrix, $B_i$, with the rest of the block being padded with zeros. In the first block, $B_1$, the symbol response row starts at the first row. In the second block, the symbol response row is SF rows lower in the block and so on. As a result, each block has a width of K and a height of $Ns \times SF$. Equation 2 illustrates an A block matrix showing the block partitions.

$$A = \begin{bmatrix} s_1 & s_2 & \cdots & s_K & 0 & 0 & \cdots & 0 & 0 & 0 & 0 & 0 & \cdots \\ 0 & 0 & 0 & 0 & \vdots & \vdots & \vdots & \vdots & \vdots & \vdots & \vdots & \vdots \\ & & & & 0 & 0 & 0 & 0 & & & & & \\ & & & & s_1 & s_2 & \cdots & s_K & & & & & \\ & & & & 0 & 0 & 0 & 0 & & & & & \\ \vdots & \vdots & \vdots & \vdots & \vdots & \vdots & \vdots & \vdots & 0 & 0 & 0 & 0 & \cdots \\ & & & & & & & & s_1 & s_2 & \cdots & s_K & \\ & & & & & & & & 0 & 0 & 0 & 0 & \\ & & & & & & & & \vdots & \vdots & \vdots & \vdots & \\ 0 & 0 & 0 & 0 & 0 & 0 & 0 & 0 & 0 & 0 & 0 & 0 & \cdots \end{bmatrix}$$

$$= [B_1 \quad B_2 \quad \cdots \quad B_{N_S}]$$

Equation 2

The n matrix has a noise value corresponding to each received combined chip, totaling $Ns \times SF$ chips. For analysis purposes, the n matrix is implicit in the received combined chip matrix, r.

Using the block notation, Equation 1 can be rewritten as Equation 3.

$$r = [B_1 \quad B_2 \quad B_3 \quad \cdots \quad B_{N_S}] \times \begin{bmatrix} d_1 \\ d_2 \\ d_3 \\ \vdots \\ d_{N_S} \end{bmatrix} + n$$

Equation 3

$$= \sum_{i=1}^{N_S} B_i \underline{d_i} + \underline{n}$$

Using a noisy version of the r matrix, the value for each unknown symbol can be determined by solving the equation. However, a brute force approach to solving Equation 1 requires extensive processing.

To reduce the processing, the system response matrix, A, is repartitioned. Each block, $B_i$, is divided into Ns blocks having a width of K and a height of SF. These new blocks are referred to as $A_1$ to $A_L$ and 0. L is the length of the common support S, as divided by the height of the new blocks, $A_1$ to $A_L$, per Equation 4.

$$L = \left\lceil \frac{SF + W - 1}{SF} \right\rceil \quad \text{Equation 4}$$

Blocks $A_1$ to $A_L$ are determined by the supports, $s_1$ to $s_K$, and the common support, S. A 0 block is a block having all zeros. A repartitioned matrix for a system having a W of 57, SF of 16 and an L of 5 is shown in Equation 5.

$$A = \begin{bmatrix} A_1 & 0 & 0 & 0 & 0 & 0 & 0 & \ldots & 0 & 0 & 0 & 0 \\ A_2 & A_1 & 0 & 0 & 0 & 0 & 0 & \ldots & 0 & 0 & 0 & 0 \\ A_3 & A_2 & A_1 & 0 & 0 & 0 & 0 & \ldots & 0 & 0 & 0 & 0 \\ A_4 & A_3 & A_2 & A_1 & 0 & 0 & 0 & \ldots & 0 & 0 & 0 & 0 \\ A_5 & A_4 & A_3 & A_2 & A_1 & 0 & 0 & \ldots & 0 & 0 & 0 & 0 \\ 0 & A_5 & A_4 & A_3 & A_2 & A_1 & 0 & \ldots & 0 & 0 & 0 & 0 \\ 0 & 0 & A_5 & A_4 & A_3 & A_2 & A_1 & \ddots & 0 & 0 & 0 & 0 \\ 0 & 0 & 0 & A_5 & A_4 & A_3 & A_2 & \ddots & 0 & 0 & 0 & 0 \\ 0 & 0 & 0 & 0 & A_5 & A_4 & A_3 & \ddots & A_1 & 0 & 0 & 0 \\ 0 & 0 & 0 & 0 & 0 & A_5 & A_4 & \ddots & A_2 & A_1 & 0 & 0 \\ 0 & 0 & 0 & 0 & 0 & 0 & A_5 & \ddots & A_3 & A_2 & A_1 & 0 \\ 0 & 0 & 0 & 0 & 0 & 0 & 0 & \ddots & A_4 & A_3 & A_2 & A_1 \end{bmatrix} \quad \text{Equation 5}$$

To reduce the complexity of the matrix, a piecewise orthogonalization approach is used. Any of the blocks $B_i$ for i being L or greater is non-orthogonal to any of the preceding L blocks and orthogonal to any blocks preceding by more than L. Each 0 in the repartitioned A matrix is an all zero block. As a result to use a piecewise orthogonalization, the A matrix is expanded (FIG. 4).

The A matrix is expanded by padding L−1 zero blocks to the right of each block of the A matrix and shifting each row in the A matrix by its row number less one. To illustrate for the A1 block in row 2 of Equation 5 four (L−1) zeros are inserted between A2 and A1 in row 2. Additionally, block A1 (as well as A2) is shifted to the right by one column (row 2−1). As a result, Equation 5 after expansion would become Equation 6.

$$A_{\exp} = \begin{bmatrix} A_1 & 0 & 0 & 0 & 0 & 0 & 0 & 0 & 0 & 0 & 0 \\ 0 & A_2 & 0 & 0 & 0 & A_1 & 0 & 0 & 0 & 0 & 0 \\ 0 & 0 & A_3 & 0 & 0 & 0 & A_2 & 0 & 0 & 0 & A_1 \\ 0 & 0 & 0 & A_4 & 0 & 0 & 0 & A_3 & 0 & 0 & 0 \\ 0 & 0 & 0 & 0 & A_5 & 0 & 0 & 0 & A_4 & 0 & 0 \\ 0 & 0 & 0 & 0 & 0 & 0 & 0 & 0 & A_5 & 0 & \cdots \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{bmatrix} \quad \text{Equation 6}$$

To accommodate the expanded A matrix, the d matrix must also be expanded, $d_{exp}$. Each block, $d_1$ to $d_{Ns}$, is expanded to a new block, $d_{exp1}$ to $d_{expNs}$. Each expanded block, $d_{exp1}$ to $d_{expNs}$, is formed by repeating the original block L times. For example for $d_{exp1}$, a first block row would be created having L versions of d1, stacked one below the other.

As a result, Equation 1 can be rewritten as Equation 7.

$$\underline{r} = A_{exp} \cdot \underline{d_{exp}} + \underline{n} \quad \text{Equation 7}$$

$$= [B_{exp1} \ B_{exp2} \ B_{exp3} \ \cdots \ B_{expN_s}] \times \begin{bmatrix} \underline{d_{exp1}} \\ \underline{d_{exp2}} \\ \underline{d_{exp3}} \\ \vdots \\ \underline{d_{expN_s}} \end{bmatrix} +$$

$$\underline{n} = \sum_{i=1}^{N_s} B_{expi} \underline{d_{expi}} + \underline{n},$$

Equation 7 can be rewritten to partition each $B_{expi}$ orthogonally in L partitions, $U_j^{(i)}$, j=1 to L, as in Equation 8.

$$\underline{r} = A_{exp} \cdot \underline{d_{exp}} + \underline{n} \quad \text{Equation 8}$$

$$= \sum_{i=1}^{N_s} [U_1^{(i)} \ U_1^{(i)} \ \cdots \ U_L^{(i)}] \times \begin{bmatrix} \underline{d_i} \\ \underline{d_i} \\ \underline{d_i} \\ \vdots \\ \underline{d_i} \end{bmatrix} +$$

$$\underline{n} = \sum_{i=1}^{N_s} \sum_{j=1}^{L} U_j^{(i)} \underline{d_i} = \sum_{i=1}^{N_s} B_i \underline{d_i} + \underline{n}$$

To reduce computational complexity, a QR decomposition of the $A_{exp}$ matrix is performed (step 52). Equation 9 illustrates the QR decomposition of $A_{exp}$.

$$A_{exp} = Q_{exp} R_{exp} \qquad \text{Equation 9}$$

Due to the orthogonal partitioning of $A_{exp}$, the QR decomposition of $A_{exp}$ is less complex. The resulting $Q_{exp}$ and $R_{exp}$ matrices are periodic with an initial transient extending over L blocks. Accordingly, $Q_{exp}$ and $R_{exp}$ can be determined by calculating the initial transient and one period of the periodic portion. Furthermore, the periodic portion of the matrices is effectively determined by orthogonalizing $A_1$ to $A_L$. One approach to QR decomposition is a Gramm-Schmidt orthogonalization.

To orthogonalize $A_{exp}$ as in Equation 6, $B_{exp1}$ is othogonalized by independently orthogonalizing each of its orthogonal partitions, $\{U_j^{(i)}\}, j = 1 \ldots L$. Each $\{A_j\}$, $j = 1 \ldots L$ is independently orthogonalized, and the set is zero-padded appropriately. $\{Q\}$ are the orthonormal sets obtained by orthogonalizing $\{U_j^{(i)}\}$. To determine $B_{exp2}$, its $U_1^{(2)}$ needs to be orthogonalized with respect to only $Q_2$ of $B_{exp1}$ formed previously. $U_2^{(2)}$, $U_3^{(2)}$ and $U_4^{(2)}$ need to be orthogonalized with respect to only $Q_3, Q_4$ and $Q_5$, respectively. $U_5^{(2)}$ needs to be orthogonalized to all previous Qs and its orthogonalized result is simply a shifted version of $Q_5$ obtained from orthogonalizing $B_{exp1}$.

As the orthogonalizing continues, beyond the initial transient, there emerges a periodicity which can be summarized as follows. The result of orthogonalizing $B_{exp1}$, $i \geq 6$ can be obtained simply by a periodic extension of the result of orthogonalizing $B_{exp5}$.

The orthogonalization of $B_{exp5}$, is accomplished as follows. Its $Q_5$ is obtained by orthogonalizing $A_5$, and then zero padding. Its $Q_4$ is obtained by orthogonalizing the support of $Q_5$ and $A_4$, [sup($Q_5$) $A_4$], and then zero padding. Since sup($Q_5$) is already an orthogonal set, only $A_4$ needs to be othogonalized with respect to sup($Q_5$) and itself. Its $Q_3$ is obtained by orthogonalizing [sup($Q_5$) sup($Q_4$) $A_3$] and then zero padding. Its $Q_2$ is obtained by orthogonalizing [sup($Q_5$) sup($Q_4$) sup($Q_3$) $A_2$] and then zero padding. Its $Q_1$ is obtained by orthogonalizing [sup($Q_5$) sup($Q_4$) sup($Q_3$) sup($Q_2$) $A_1$] and then zero padding. Apart from the initial transient, the entire $A_{exp}$ can be efficiently orthogonalized, by just orthogonalizing $A_p$ per Equation 10.

$$A_p = [A_5 A_4 A_3 A_2 A_1] \qquad \text{Equation 10}$$

By effectively orthogonalizing the periodic portion of $A_{exp}$ by using only $A_p$, computational efficiency is achieved. Using a more compact notation, $Q_i^s$, for sup ($Q_i$), this orthogonalization of $A_p$ results in the orthonormal matrix, $Q_p$, of Equation 11.

$$Q_p = [Q_5^s Q_4^s Q_3^s Q_2^s Q_1^s] \qquad \text{Equation 11}$$

The periodic part of $Q_{exp}$ is per Equation 12.

$$PeriodicPartofQ_{exp} = \qquad \text{Equation 12}$$

$$\begin{bmatrix}
0 & 0 & 0 & 0 & 0 & 0 & 0 & 0 & 0 & 0 & \cdots \\
\vdots & \vdots & \vdots & \vdots & \vdots & \vdots & \vdots & \vdots & \vdots & \vdots & \\
Q_1^s & 0 & 0 & 0 & 0 & & 0 & 0 & 0 & 0 & \\
0 & Q_2^s & 0 & 0 & 0 & Q_1^s & 0 & 0 & 0 & 0 & \\
0 & 0 & Q_3^s & 0 & 0 & 0 & Q_2^s & 0 & 0 & 0 & \\
0 & 0 & 0 & Q_4^s & 0 & 0 & 0 & Q_3^s & 0 & 0 & \\
0 & 0 & 0 & 0 & Q_5^s & 0 & 0 & 0 & Q_4^s & 0 & \cdots \\
0 & 0 & 0 & 0 & 0 & 0 & 0 & 0 & 0 & Q_5^s & \\
0 & 0 & 0 & 0 & 0 & 0 & 0 & 0 & 0 & 0 & \\
\vdots & \vdots & \vdots & \vdots & \vdots & \vdots & \vdots & \vdots & \vdots & 0 & \\
0 & 0 & 0 & 0 & 0 & 0 & 0 & 0 & 0 & 0 & \cdots
\end{bmatrix}$$

To constructing the upper triangular matrix $R_{exp}$, $<A_i>_j$ is a block of size K×K representing the projections of each column of $A_i$ onto all the columns of $Q_j^s$. For example, the first column of $<A_4>_5$ represents the projections of the first column of $A_4$ on each of the K columns of $Q_5^s$. Similarly, $<A_4>_4$ represents the projections of the first column of $A_4$ on each of the K columns of $Q_4^s$. However, this block will be upper triangular, because the $k^{th}$ column of $A_4$ belongs to the space spanned by the orthonormal vectors of $Q_5^s$ and the first k vectors of $Q_4^s$. This block is also orthogonal to subsequent vectors in $Q_4^s$, leading to an upper triangular $<A_4>_4$. Any $<A_i>_j$ with i=j will be upper triangular. To orthogonalize other blocks, the following results.

The first block of $B_{exp5}$, viz., $U_1^{(5)}$ is formed by a linear combination of $\{Q_j^s\}, j=1 \ldots 5$, with coefficients given by $<A_1>_j, j=1 \ldots 5$. The second block, $U_2^{(5)}$, is formed by a linear combination of $\{Q_j^s\}, j=2 \ldots 5$, with coefficients given by $<A_2>_j, j=2 \ldots 5$. The third block, $U_3^{(5)}$, is formed by a linear combination of $\{Q_j^s\} j=3 \ldots 5$, with coefficients given by $<A_2>_j, j=3 \ldots 5$. The fourth block, $U_4^{(5)}$, is formed by a linear combination of $\{Q_j^s\}, j=4,5$, with coefficients given by $<A_2>_j, j=4,5$. The fifth block, $U_5^{(5)}$, is formed by $Q_5^s \times <A_5>_5$.

Accordingly, the coefficients in the expansion of subsequent $B_{expi}$, $i \geq 6$ are simply periodic extensions of the above. Since the $R_{exp}$ entries are computed during the orthogonalization of $A_{exp}$, no additional computations are needed to construct $R_{exp}$. Disregarding the initial transient, the remainder of $R_{exp}$ is periodic, and two periods of it are shown in Equation 13.

$$R_{exp} = \begin{bmatrix} 0 & 0 & 0 & 0 & 0 & 0 & 0 & 0 & 0 & 0 & \cdots \\ \vdots & \vdots & \vdots & \vdots & \vdots & \vdots & \vdots & \vdots & \vdots & & \\ 0 & & & & & & & & & & \\ \langle A_1 \rangle_5 & & & & & & & & & & \\ 0 & & & & & & & & & & \\ 0 & & & & & & & & & & \\ 0 & & & & & & & & & & \\ \langle A_1 \rangle_4 & 0 & 0 & 0 & 0 & 0 & 0 & 0 & 0 & & \\ 0 & \langle A_2 \rangle_5 & 0 & 0 & 0 & \langle A_1 \rangle_5 & 0 & 0 & 0 & & \\ 0 & 0 & 0 & 0 & 0 & 0 & 0 & 0 & 0 & & \\ 0 & 0 & 0 & 0 & 0 & 0 & 0 & 0 & 0 & & \\ \langle A_1 \rangle_3 & 0 & 0 & 0 & 0 & 0 & 0 & 0 & 0 & & \\ 0 & \langle A_2 \rangle_4 & 0 & 0 & 0 & \langle A_1 \rangle_4 & 0 & 0 & 0 & & \\ 0 & 0 & \langle A_3 \rangle_5 & 0 & 0 & 0 & \langle A_2 \rangle_5 & 0 & 0 & & \\ 0 & 0 & 0 & 0 & 0 & 0 & 0 & 0 & 0 & & \\ \langle A_1 \rangle_2 & 0 & 0 & 0 & 0 & 0 & 0 & 0 & 0 & & \\ 0 & 0 & \langle A_2 \rangle_3 & 0 & 0 & 0 & \langle A_1 \rangle_3 & 0 & 0 & 0 & \\ 0 & 0 & \langle A_3 \rangle_4 & 0 & 0 & 0 & \langle A_2 \rangle_4 & 0 & 0 & & \\ 0 & 0 & 0 & \langle A_4 \rangle_5 & 0 & 0 & 0 & \langle A_3 \rangle_5 & 0 & & \cdots \\ \langle A_1 \rangle_1 & 0 & 0 & 0 & 0 & 0 & 0 & 0 & 0 & & \\ 0 & \langle A_2 \rangle_2 & 0 & 0 & 0 & \langle A_1 \rangle_2 & 0 & 0 & 0 & & \\ 0 & 0 & \langle A_3 \rangle_3 & 0 & 0 & 0 & \langle A_2 \rangle_3 & 0 & 0 & & \\ 0 & 0 & 0 & \langle A_4 \rangle_4 & 0 & 0 & 0 & \langle A_3 \rangle_4 & 0 & & \\ 0 & 0 & 0 & 0 & \langle A_5 \rangle_5 & 0 & 0 & 0 & \langle A_4 \rangle_5 & & \\ 0 & 0 & 0 & 0 & 0 & \langle A_1 \rangle_1 & 0 & 0 & 0 & & \\ 0 & 0 & 0 & 0 & 0 & 0 & \langle A_2 \rangle_2 & 0 & 0 & & \\ 0 & 0 & 0 & 0 & 0 & 0 & 0 & \langle A_3 \rangle_3 & 0 & & \\ 0 & 0 & 0 & 0 & 0 & 0 & 0 & 0 & \langle A_4 \rangle_4 & & \\ 0 & 0 & 0 & 0 & 0 & 0 & 0 & 0 & 0 & \langle A_5 \rangle_5 & \\ 0 & 0 & 0 & 0 & 0 & 0 & 0 & 0 & 0 & 0 & \langle A_1 \rangle_1 \end{bmatrix} \quad \text{Equation 16}$$

The least squares approach to solving $Q_{exp}$ and $R_{exp}$ is shown in Equation 14.

$$Q_{exp} \cdot R_{exp} \cdot d_{exp} = r \quad \text{Equation 14}$$

By pre-multiplying both sides of Equation 14 by the transpose of $Q_{exp}$, $Q_{exp}^T$, and using $Q_{exp}^T \cdot Q_{exp} = I_{LKN_s}$, Equation 14 becomes Equation 15.

$$R_{exp} \cdot d_{exp} = Q_{exp}^T r \quad \text{Equation 15}$$

Equation 15 represents a triangular system whose solution also solves the LS problem of Equation 14.

Due to the expansion, the number of unknowns is increased by a factor of L. Since the unknowns are repeated by a factor of L, to reduce the complexity, the repeated unknowns can be collected to collapse the system. $R_{exp}$ is collapsed using L coefficient blocks, $CF_1$ to $CF_L$, each having a width and a height of K. For a system having an L of 5, $CF_1$ to $CF_5$ can be determined as in Equation 16.

$$CF_1 = \langle A_1 \rangle_1 + \langle A_2 \rangle_2 + \langle A_3 \rangle_3 + \langle A_4 \rangle_4 + \langle A_5 \rangle_5$$

$$CF_2 = \langle A_1 \rangle_2 + \langle A_2 \rangle_3 + \langle A_3 \rangle_4 + \langle A_4 \rangle_5$$

$$CF_3 = \langle A_1 \rangle_3 + \langle A_2 \rangle_4 + \langle A_3 \rangle_5$$

$$CF_4 = \langle A_1 \rangle_4 + \langle A_2 \rangle_5$$

$$CF_5 = \langle A_1 \rangle_5 \quad \text{Equation 16}$$

Collapsing $R_{exp}$ using the coefficient blocks produces a Cholesky like factor, G (step 54). By performing analogous operations on the right hand side of Equation 15 results in a banded upper triangular system of height and width of K×Ns as in Equation 17.

$$\begin{bmatrix} Tr_1 & Tr_2 & Tr_3 & Tr_4 & CF_5 & 0 & 0 & 0 & 0 & 0 & \cdots \\ 0 & Tr_1 & Tr_2 & CF_3 & CF_4 & CF_5 & 0 & 0 & 0 & 0 & \cdots \\ 0 & 0 & CF_1 & CF_2 & CF_3 & CF_4 & CF_5 & 0 & 0 & 0 & \cdots \\ 0 & 0 & 0 & CF_1 & CF_2 & CF_3 & CF_4 & CF_5 & 0 & 0 & \cdots \\ 0 & 0 & 0 & 0 & CF_1 & CF_2 & CF_3 & CF_4 & CF_5 & 0 & \cdots \\ \vdots & \vdots & \vdots & \vdots & 0 & \ddots & \ddots & \ddots & \ddots & \ddots & 0 \end{bmatrix} \times \begin{bmatrix} d_1 \\ d_2 \\ d_3 \\ \vdots \\ d_{N_s} \end{bmatrix} = \hat{r} \quad \text{Equation 17}$$

Tr$_1$ to Tr$_4$ are the transient terms and $\hat{r}$ represents the right hand side of Equation 15. By solving the upper traingle via back substitution, Equation 12 can be solved to determine d (step 56). As a result, the transmitted data symbols of the K data burst are determine.

Using the piecewise orthogonalization and QR decomposition, the complexity of solving the least square problem when compared with a banded Cholesky decomposition is reduced by a factor of 6.5.

What is claimed is:

1. A user equipment for receiving a plurality of transmitted data signals in a communication system, the user equipment comprising:
    an antenna for receiving the transmitted data signals;
    a channel estimation device for determining a channel response for each received data signal;
    a joint detection device having an input connected with said channel estimation device to receive the channel responses and having an input connected with said antenna to receive received data signals; and
    said joint detection device configured to determine a system response based on in part the channel responses, configured to expand the system response to be piecewise orthogonal, and configured to retrieve data from the received data signals based on in part the expanded system response.

2. The user equipment of claim 1 for use in a time division duplex using code division multiple access communication system wherein said joint detection device is connected to said antenna via a demodulator.

3. The user equipment of claim 1 configured for use in a system where each of the transmitted data signals has an associate code and is transmitted in a shared frequency spectrum wherein said joint detection device is configured to determine the system response by convolving associated chip codes with the channel response.

4. A user equipment for receiving a plurality of transmitted data signals in a communication system, the user equipment comprising:
    means for receiving the transmitted data signals;
    means for determining a channel response for each received data signal; and
    joint detector means coupled with said receiving means and said determining means configured to determine a system response based on in part the channel responses, to expand the system response to be piecewise orthogonal, and to retrieve data from the received data signals based on in part the expanded system response.

5. The user equipment of claim 4 for use in a time division duplex using code division multiple access communication system wherein said joint detector means is coupled with said receiving means via demodulator means.

6. The user equipment of claim 4 configured for use in a system where each of the transmitted data signals has an associate code and is transmitted in a shared frequency spectrum wherein said joint detector means is configured to determine the system response by convolving the associated chip codes with the channel response.

* * * * *

UNITED STATES PATENT AND TRADEMARK OFFICE
CERTIFICATE OF CORRECTION

PATENT NO.      : 7,295,596 B2
APPLICATION NO. : 11/010703
DATED           : November 13, 2007
INVENTOR(S)     : Misra et al.

It is certified that error appears in the above-identified patent and that said Letters Patent is hereby corrected as shown below:

IN THE SPECIFICATION

Column 3, delete Equation 1, and insert therefor --$\underline{r} = A\underline{d} + \underline{n}$--.

Column 3, line 33, after the word "chips", delete "r" and insert therefor --$\underline{r}$--.

Column 3, line 35, before the word "represents", delete "d. The term, n,", and insert therefor --$\underline{d}$. The term, $\underline{n}$,--.

Column 3, line 40, after the word "matrix", delete "d. The d" and insert therefor --$\underline{d}$. The $\underline{d}$--.

Column 3, line 41, after the word "blocks", delete "$d_1$ to $d_{Ns}$", and insert therefor --$\underline{d}_1$ to $\underline{d}_{Ns}$--.

Column 3, line 42, after the word "block", delete "$d_i$" and insert therefor --$\underline{d}_i$--.

Column 3, line 44, after the word "block", delete "$d_i$" and insert therefor --$\underline{d}_i$--.

Column 3, line 46, after the word "that", delete "$d_1$" and insert therefor --$\underline{d}_1$--.

Column 3, line 47, after the words "top of", delete "$d_2$" and insert therefor --$\underline{d}_2$--.

Column 3, line 52, after the first use of the word "matrix", delete "r. The matrix r" and insert therefor --$\underline{r}$. The matrix $\underline{r}$--.

Column 3, line 61, before the words "for each", delete "$h_i$" and insert therefor --$\underline{h}_i$--.

Column 3, line 62, after the word "Each", delete "$h_i$" and insert therefor --$\underline{h}_i$--.

Column 3, line 67, after the word "responses", delete "$s_1$ to $s_K$" and insert therefor --$\underline{s}_1$ to $\underline{s}_K$--.

Column 4, line 5, after the word "responses", delete "$s_1$ to $s_K$" and insert therefor --$\underline{s}_1$ to $\underline{s}_K$--.

Column 4, line 7, before the word "matrix", delete "d" and insert therefor --$\underline{d}$--.

UNITED STATES PATENT AND TRADEMARK OFFICE
CERTIFICATE OF CORRECTION

PATENT NO. : 7,295,596 B2
APPLICATION NO. : 11/010703
DATED : November 13, 2007
INVENTOR(S) : Misra et al.

It is certified that error appears in the above-identified patent and that said Letters Patent is hereby corrected as shown below:

Column 4, line 7, after the word "matrix", delete "$d_1$ to $d_{Ns}$" and insert therefor --$\underline{d}_1$ to $\underline{d}_{Ns}$--.

Column 4, line 7, after the word "example", delete "$d_1$" and insert therefor --$\underline{d}_1$--.

Column 4, line 8, after the word "responses", delete "$s_1$ to $s_K$" and insert therefor --$\underline{s}_1$ to $\underline{s}_K$--.

Column 4, Equation 2, line 20, columns 1, 2, & 4, delete "$s_1$ $s_2$ sK", and insert therefor --$\underline{s}_1$ $\underline{s}_2$ $\underline{s}_K$-- respectively.

Column 4, Equation 2, line 23, columns 5, 6, & 8, delete "$s_1$ $s_2$ sK", and insert therefor --$\underline{s}_1$ $\underline{s}_2$ $\underline{s}_K$-- respectively.

Column 4, Equation 2, line 27, columns 9, 10, & 12, delete "$s_1$ $s_2$ sK", and insert therefor --$\underline{s}_1$ $\underline{s}_2$ $\underline{s}_K$-- respectively.

Column 4, line 35, before the word "matrix", delete "n" and install therefor --$\underline{n}$--.

Column 4, line 37, before the word "matrix", delete "n" and install therefor --$\underline{n}$--.

Column 4, line 38, after the word "matrix", delete "r" and install therefor --$\underline{r}$--.

Column 4, line 59, before the word "matrix", delete "r" and install therefor --$\underline{r}$--.

Column 5, line 9, after the word "supports", delete "$s_1$ to $s_K$" and insert therefor --$\underline{s}_1$ to $\underline{s}_K$--.

Column 5, Equation 5, column 8, lines 24 thru 29, delete "$\ddot{.}$" and insert --$\underline{\ddot{.}}$--

Column 6, line 1, before the second use of the word "matrix", delete "d" and install therefor --$\underline{d}$--.

Column 6, line 2, after the word "expanded", delete "$d_{exp}$. Each block, $d_1$ to $d_{Ns}$" and insert therefor --$\underline{d}_{exp}$. Each block, $\underline{d}_1$ to $\underline{d}_{Ns}$--.

UNITED STATES PATENT AND TRADEMARK OFFICE
CERTIFICATE OF CORRECTION

PATENT NO. : 7,295,596 B2
APPLICATION NO. : 11/010703
DATED : November 13, 2007
INVENTOR(S) : Misra et al.

It is certified that error appears in the above-identified patent and that said Letters Patent is hereby corrected as shown below:

Column 6, line 3, after the word "block", delete "$d_{exp1}$ to $d_{expNs}$" and insert therefor --$\underline{d}_{exp1}$ to $\underline{d}_{expNs}$--.

Column 6, line 4, after the word "block", delete "$d_{exp1}$ to $d_{expNs}$" and insert therefor --$\underline{d}_{exp1}$ to $\underline{d}_{expNs}$--.

Column 6, line 5, after the word "for", delete "$d_{exp1}$" and insert therefor --$\underline{d}_{exp1}$--.

Column 6, line 6, before the word "stacked", delete "d1" and install therefor --$d_1$--.

Column 6, delete Equation 8, lines 55 thru 57, and insert therefor $$-- = \sum_{i=1}^{N_s}[U_1^{(i)} U_2^{(i)} \ldots U^{(i)}{}_L] \times \begin{bmatrix} \underline{d_i} \\ \underline{d_i} \\ \underline{d_i} \\ \vdots \\ \underline{d_i} \end{bmatrix} + --.$$

Column 8, line 32, before the words "the upper", delete "To constructing" and insert therefor --Constructing--.

Column 8, line 56, before the words, "with coefficients", delete "j = 4,5," and insert therefor --j = 4, … 5,--.

Column 9, delete Equation 14, and insert therefor --$Q_{exp} \cdot R_{exp} \cdot \underline{d}_{exp} = \underline{r}$--.

Column 9, delete Equation 15, and insert therefor --$R_{exp} \cdot \underline{d}_{exp} = Q_{exp}{}^T \underline{r}$--.

UNITED STATES PATENT AND TRADEMARK OFFICE
CERTIFICATE OF CORRECTION

PATENT NO. : 7,295,596 B2
APPLICATION NO. : 11/010703
DATED : November 13, 2007
INVENTOR(S) : Misra et al.

It is certified that error appears in the above-identified patent and that said Letters Patent is hereby corrected as shown below:

Column 10, Equation 17, line 63, columns 6 thru 10, delete " $.\cdot\dot{\ }$ " and insert therefor -- $\dot{\ }\cdot\dot{\ }$ --.

Column 11, line 2, after the word "upper" delete "traingle" and insert therefor --triangle--.

Column 11, line 3, after the word "determine", delete "d" and insert therefor --$\underline{d}$--.

Column 11, line 5, after the word "data", delete "burst" and insert therefor --bursts--.

IN THE CLAIMS

Column 12, line 27, before the word "associated", delete "the".

Signed and Sealed this

Twenty-seventh Day of May, 2008

JON W. DUDAS
*Director of the United States Patent and Trademark Office*